United States Patent [19]
Russek et al.

[11] Patent Number: 5,753,007
[45] Date of Patent: May 19, 1998

[54] OXYGEN PRODUCTION BY ION TRANSPORT MEMBRANES WITH NON-PERMEATE WORK RECOVERY

[75] Inventors: Steven Lee Russek; Jeffrey Alan Knopf, both of Allentown, Pa.; Dale M. Taylor, Salt Lake City, Utah

[73] Assignee: Air Products and Chemicals, Inc., Allentown, Pa.

[21] Appl. No.: 799,905

[22] Filed: Feb. 13, 1997

Related U.S. Application Data

[63] Continuation of Ser. No. 479,290, Jun. 7, 1995, abandoned.
[51] Int. Cl.$^6$ ............................................. B01D 53/22
[52] U.S. Cl. .................. 95/41; 95/54; 95/96; 95/130; 95/138; 95/288
[58] Field of Search ............................. 95/39, 41, 45, 95/54, 96–106, 130, 138, 148, 288

[56] References Cited

U.S. PATENT DOCUMENTS

| | | | |
|---|---|---|---|
| Re. 34,595 | 5/1994 | Chen et al. | 95/54 |
| 4,545,787 | 10/1985 | Hegarty | 55/16 |
| 4,560,394 | 12/1985 | McDonald et al. | 95/54 |
| 4,879,016 | 11/1989 | Joshi | 204/242 |
| 5,035,726 | 7/1991 | Chen et al. | 95/54 |
| 5,035,727 | 7/1991 | Chen | 55/16 |
| 5,118,395 | 6/1992 | Chen et al. | 204/59 |
| 5,151,022 | 9/1992 | Emerson et al. | 95/39 X |
| 5,152,812 | 10/1992 | Kovach | 95/41 |
| 5,160,618 | 11/1992 | Burggraaf et al. | 210/490 |
| 5,169,415 | 12/1992 | Roettger et al. | 95/54 |
| 5,174,866 | 12/1992 | Chen et al. | 204/59 |
| 5,240,480 | 8/1993 | Thorogood et al. | 96/4 |
| 5,245,110 | 9/1993 | Van Dijk et al. | 585/946 |
| 5,354,547 | 10/1994 | Rao et al. | 95/41 X |
| 5,429,664 | 7/1995 | Lee | 95/54 |
| 5,516,359 | 5/1996 | Kang et al. | 95/14 |
| 5,562,754 | 10/1996 | Kang et al. | 95/54 |
| 5,565,017 | 10/1996 | Kang et al. | 95/14 |

FOREIGN PATENT DOCUMENTS

| | | | |
|---|---|---|---|
| 4-090819 | 3/1992 | Japan | 95/54 |

OTHER PUBLICATIONS

J.D. Wright et al., "Advanced Oxygen Separation Membranes", Report No. TDA–GRI–90/0303, prepared for the Gas Research Institute, Sep. 1990.
D.J. Clark et al., "Separation of Oxygen by Using Zirconia Solid Electrolyte Membranes", *Gas Separation and Purification*, 1992, vol. 6, No. 4, pp. 201–205.
Wright, J. D. Copleland, R. J., "Advanced Oxygen Separation Membranes", Report no. TDA–GRI–90/0303, prepared for the Gas Research Institute, Sep. 1990.
Clark, D. J. et al., "Separation of Oxygen by Using Zirconia Solid Electrolyte Membranes" in *Gas Separation and Purification* 1992, vol. 6, No. 4, pp. 201–205.

*Primary Examiner*—Robert Spitzer
*Attorney, Agent, or Firm*—John M. Fernbacher

[57] ABSTRACT

Oxygen is recovered from a hot, compressed oxygen-containing gas, preferably air, by an oxygen-selective ion transport membrane system. Hot, pressurized non-permeate gas from the membrane is cooled and useful work is recovered therefrom by expansion at temperatures below the operating temperature of the membrane. The recovered work is used together with the oxygen permeate product in applications such as oxygen-enriched combustion of liquid fuels, wood pulping processes, steel production from scrap in mini-mills, and metal fabrication operations. Oxygen permeate product can be compressed utilizing a gas booster compressor driven by expansion of cooled, pressurized non-permeate gas.

18 Claims, 4 Drawing Sheets

OXYGEN PRODUCTION BY ION TRANSPORT MEMBRANES WITH NON-PERMEATE WORK RECOVERY

This application is a continuation of application Ser. No. 08/479,290 filed on Jun. 7, 1995, now abandoned.

FIELD OF THE INVENTION

The invention is directed to the separation of oxygen from oxygen-containing gas by ion transport membranes, and in particular to the recovery of useful work from cooled, pressurized, oxygen-depleted non-permeate gas in conjunction with utilization of the oxygen permeate product.

BACKGROUND OF THE INVENTION

Oxygen can be recovered from air at high temperatures by inorganic oxide ceramic materials utilized in the form of selectively permeable non-porous ion transport membranes. An oxygen partial pressure differential or a voltage differential across the membrane causes oxygen ions to migrate through the membrane from the feed side to the permeate side where the ions recombine to form electrons and oxygen gas. An ion transport membrane of the pressure-driven type is defined herein as a mixed conductor membrane, in which the electrons simultaneously migrate through the membrane to preserve internal electrical neutrality. An ion transport membrane of the electrically-driven type is defined herein as a solid electrolyte membrane in which the electrons flow from the permeate side to the feed side of the membrane in an external circuit driven by a voltage differential. A comprehensive review of the characteristics and applications of such membranes is given in report entitled "Advanced Oxygen Separation Membranes" by J. D. Wright and R. J. Copeland, Report No. TDA-GRI-90/0303 prepared for the Gas Research Institute, September 1990.

In the recovery of oxygen from air at high temperatures (typically 700° C. to 1100° C.) using ion transport membranes, a significant amount of heat energy is available in the membrane permeate and non-permeate streams. Energy recovery and effective utilization thereof is possible by the integration of compressors, combustors, hot gas turbines, steam turbines, and heat exchangers with the mixed conductor membrane module. U.S. Pat. No. 4,545,787 discloses the production of oxygen and net power in the integrated operation of a mixed conductor ceramic membrane. Air is compressed, heated, and passed through a membrane separator to produce an oxygen permeate and an oxygen-containing non-permeate stream. The non-permeate stream is combusted with a fuel and the hot combustion gases are expanded in a hot gas turbine. The turbine provides shaft power for the compressor and drives a generator for export of electricity, and turbine exhaust is optionally used to cogenerate steam or to preheat the compressed air membrane feed. Alternately, the membrane is placed downstream of the combustion step.

U.S. Pat. No. 5,035,727 describes the recovery of oxygen by a solid electrolyte membrane in conjunction with an externally-fired gas turbine in which compressed air is heated indirectly and passed through the membrane module. Non-permeate gas is expanded through a hot gas turbine, the turbine exhaust is heated by direct combustion, and the combustion products provide heat indirectly to the membrane feed. Steam is recovered from the waste heat after heat exchange with the membrane feed.

U.S. Pat. No. 5,118,395 describes the recovery of oxygen from gas turbine exhaust utilizing a solid electrolyte membrane with the coproduction of electric power and steam. A supplemental burner heats the turbine exhaust prior to the membrane, and steam is generated by the membrane non-permeate stream. Related U.S. Pat. No. 5,174,866 discloses a similar system in which intermediate turbine exhaust is passed through the membrane and the membrane non-permeate stream is further expanded through another turbine stage. In both patents, turbine shaft power is used to drive the air compressor and an electric generator.

The report by J. D. Wright and R. J. Copeland identified above discloses at p. 55 a gas turbine-driven ceramic membrane system in which air is compressed, heated indirectly in a fired heater, and passed through the membrane to yield oxygen and non-permeate gas. The non-permeate gas is combusted with natural gas in the fired heater and the combustion products are expanded through a hot gas turbine to drive the compressor and generate electric power. Heating of the air feed to the membrane and the combustion of fuel and non-permeate gas prior to the turbine thus are accomplished in a single integrated combustion chamber.

U.S. Pat. No. 5,245,110 (equivalent to PCT International Publication No. WO 93/06041) discloses the integration of a gas turbine with an oxygen-selective membrane system. The permeate side of the membrane is swept with air to yield an enriched air product containing about 35 vol % oxygen. The enriched air product is used in a hydrocarbon reformer or gasifier process, and tail gas from the reformer or gasifier is introduced into the gas turbine combustor to balance the flow of hot gas to the turbine. The nitrogen from the permeate and membrane sweep air replaces the mass lost when oxygen is consumed in the reformer or gasifier process, which maintains the turbine in a desired mass and thermal balance.

An article entitled "Separation of Oxygen by Using Zirconia Solid Electrolyte Membranes" by D. J. Clark et al in *Gas Separation and Purification* 1992, Vol. 6, No. 4, pp. 201–205 discloses an integrated coal gasification-gas turbine cogeneration system with recovery of oxygen for use in the gasifier. Membrane non-permeate is combusted with gas from the gasifier and passed to the gas turbine cogeneration system.

In the state of the art characterized by the above references, the energy contained in the hot pressurized non-permeate gas from the ion transport membrane is recovered in high temperature expansion turbines operating at or above the membrane temperature. This type of energy recovery is well-suited for the integration of ion transport membranes with combined cycle power generation systems which utilize gas-fueled combustion turbines to generate electric power. The recovery of energy or useful work contained in the pressurized non-permeate gas at temperatures below the membrane operating temperature is not addressed in the prior art.

The recovery of energy or useful work from the pressurized non-permeate gas at lower temperatures will allow the use of the non-permeate gas in applications which are not possible with methods taught in the prior art. The invention described in the following disclosure and defined in the appended claims addresses the recovery of energy contained in the pressurized non-permeate at temperatures below the membrane temperature, and discloses the utilization of this energy with the oxygen permeate product in several integrated applications.

SUMMARY OF THE INVENTION

The invention is a process for the recovery of oxygen from an oxygen-containing gas which comprises compressing and heating a stream of oxygen-containing feed gas to yield a hot pressurized feed, and passing the hot pressurized feed into a membrane separation zone comprising one or more oxygen-selective ion transport membranes which divide the zone into a feed side and a permeate side. A hot, pressurized, oxygen-depleted non-permeate gas is withdrawn from the feed side and a hot oxygen permeate product is recovered from the permeate side of the separation zone, which operates at a first temperature. At least a portion of the hot, pressurized, oxygen-depleted non-permeate gas is cooled to a second temperature, and useful work is recovered from at least a portion of the resulting gas. Preferably, the oxygen-containing feed gas is air, and the oxygen permeate product is high purity oxygen which contains at least 98 vol% oxygen. The stream of oxygen-containing feed gas can be heated at least in part by indirect heat exchange with the hot, pressurized, oxygen-depleted non-permeate gas and optionally with the hot oxygen permeate product.

When the ion transport membrane is a mixed conductor membrane, the stream of oxygen-containing feed gas is heated further in an additional heating step to yield the hot pressurized feed. This additional heating step is selected from the group consisting of electrical resistance heating, direct combustion of the hot pressurized feed with a fuel, or indirect heat exchange with a hot process fluid. When the ion transport membrane is a solid electrolyte membrane, the additional heating step utilizes a portion of the heat generated in the operation of the solid electrolyte membrane.

The useful work recovered from the cooled non-permeate gas is preferably utilized in combination with the oxygen permeate product. In one embodiment, a portion of the cooled, pressurized, oxygen-depleted non-permeate gas is used to atomize a liquid fuel in an oxygen-enriched combustion process which utilizes the oxygen permeate product as a portion of the oxidant for combusting the fuel. The cooled, pressurized, oxygen-depleted non-permeate gas can be used at a temperature up to 600° F. for vaporizing the liquid fuel. In an alternative embodiment, the hot oxygen permeate product is cooled and compressed in a compressor driven by the expansion of a portion of the resulting cooled, pressurized, oxygen-depleted non-permeate gas. In another embodiment, the cooled, pressurized, oxygen-depleted non-permeate gas provides the feed to a pressure swing adsorption (PSA) or a polymeric membrane permeation process and a high-purity nitrogen product is recovered therefrom. Feed compression typically is not required because the pressure of the cooled, pressurized, oxygen-depleted non-permeate gas is sufficient to provide the pressure driving force for the PSA or the polymeric membrane processes.

DETAILED DESCRIPTION OF THE INVENTION

Figure 1:
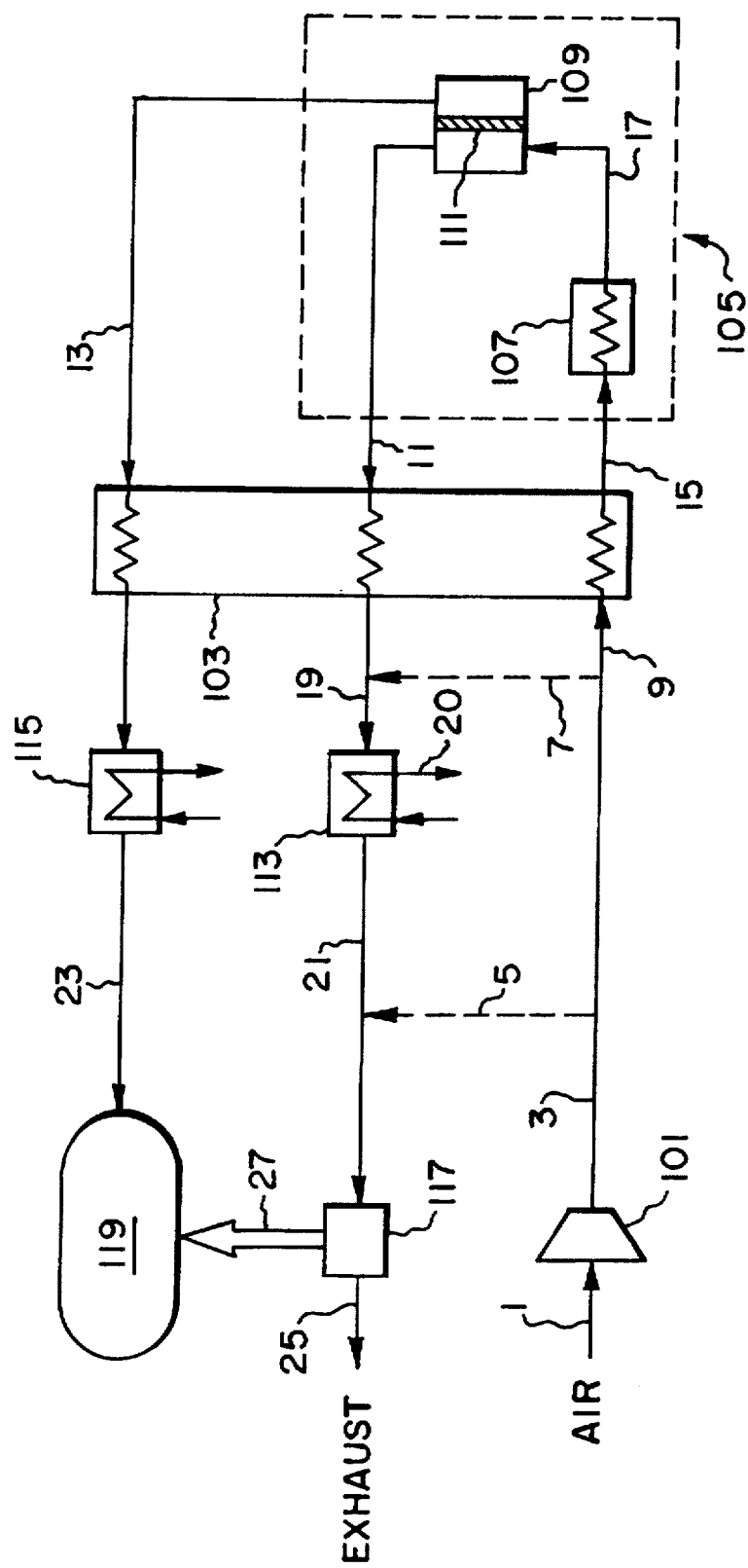
FIG. 1 is a flow diagram of the general embodiment of the present invention.

The present invention utilizes a solid ceramic ion transport membrane integrated with compression, heating, and energy recovery steps to produce oxygen from an oxygen-containing gas, preferably air. The membrane operates by a mechanism in which an oxygen partial pressure differential or a voltage differential across the membrane causes oxygen ions to migrate through the membrane from the feed side to the permeate side where the oxygen ions recombine to form oxygen gas and free electrons. An ion transport membrane of the pressure-driven type is defined herein as a mixed conductor membrane in which the electrons simultaneously migrate through the membrane to preserve internal electrical neutrality. The term pressure-driven means that oxygen ions move through the membrane in the direction of decreasing oxygen partial pressure. An ion transport membrane of the electrically-driven type is defined herein as a solid electrolyte membrane in which the electrons flow from the permeate side to the feed side of the membrane in an external circuit driven by a voltage differential. A mechanically perfect membrane of either type operating without gas leakage is infinitely selective for oxygen; in practical applications a high-purity oxygen product containing at least 98 vol % oxygen is achievable.

The key feature of the invention as described herein is the recovery of energy or useful work by expansion of the pressurized, oxygen-depleted non-permeate gas at a temperature below the membrane operating temperature. Recovering energy or useful work by expansion at temperatures below the operating temperature of the membrane allows the selection of a wider range of methods to utilize this work compared with the prior art in the operation of ion transport membranes. In prior art methods, the pressurized, oxygen-depleted non-permeate gas is utilized at or above the membrane operating temperature by expansion through a hot gas expansion turbine to generate work typically used to compress the feed air and optionally to generate electric power.

The definition of useful work in the present specification is that work produced by expansion of the cooled, pressurized, oxygen-depleted non-permeate gas. This useful work can be utilized in numerous applications including the following: a) operation of pneumatic tools and equipment such as drills, grinders, air motors, chippers, gas boosters, hammers, impact wrenches, and the like; b) atomization of single or multi-phase fluids in gas-driven nozzles, e.g. fuels, paints, pigments, adhesives, slurries, and the like; c) pneumatic conveying of solids; d) separation of the cooled, pressurized, oxygen-depleted non-permeate gas into higher-purity nitrogen products by pressure swing adsorption or polymeric membrane permeation processes without the need for further feed compression; e) mechanical deformation of materials by stamping or gas blowing, for example the manufacture of glass or plastic bottles; and f) acceleration of particulate matter for cleaning or finishing of material surfaces. Numerous additional applications are possible such as those listed in the *Compressed Air and Gas Handbook*, Fifth Edition, J. P. Rollins, Editor, Prentice-Hall (1973), pp.265–412. The recovery of work from the cooled, pressurized, oxygen-depleted non-permeate gas may be carried out in combination with use of the oxygen permeate product as an oxidant in combustion systems such as process furnaces, boilers, incinerators, welding and cutting equipment, and the like. The oxygen permeate product also can be used as a reactant or oxidant in chemical reactions such as those which occur in wastewater treatment, wood pulp bleaching and delignification, wood pulping liquor oxidation, and related applications.

The general embodiment of the present invention is illustrated in FIG. 1. Oxygen-containing gas 1, preferably air, is compressed in compression zone 101 to a pressure between 30 and 500 psia, preferably 80 to 200 psia. Compression zone 101 includes a centrifugal, axial, screw, or reciprocating compressor, optionally multistaged, and optionally intercooled. When operating without intercooling in an adiabatic mode, compressed feed 3 will be at a temperature of 350° to 1,100° F.; when operated with intercooling in an isothermal mode, compressed feed 3 will be at 150° to 350° F. Optionally a portion 5 or 7 of compressed feed 3 is withdrawn for other uses (described later). Compressed feed 9 is preheated in heat exchange zone 103 by indirect heat exchange with hot process stream 11 (later defined) and optionally with hot process stream 13 (later defined), and preheated feed 15 is introduced into separation zone 105.

Separation zone 105 comprises final heating zone 107 and ion transport membrane zone 109. Ion transport membrane zone 109 contains one or more solid ceramic membrane assemblies in the form of tubes, plates, or a monolithic honeycomb with means for introducing and withdrawing feed and product gases; one or more modules can be arranged in series or parallel stages if required (not shown). When a solid electrolyte membrane is utilized, electrode and circuit means are included to impose a voltage across the membrane. In this case, ion transport membrane 111 is driven by a voltage differential of 100–2000 mV across the membrane in which electrons are conducted through an external circuit with porous electrodes attached to the surfaces of the membrane. In this mode of operation the oxygen permeate product can be recovered above the feed pressure if desired.

Membrane 111 divides membrane zone 109 into a feed side and a permeate side. Typical compositions of the active membrane material are given in representative articles by Y. Teraoka et al in *Chemistry Letters*, 1985, pp.1743–1746 and by H. Iwahara et al in *Advances in Ceramics*, Vol. 24: Science and Technology of Zirconia III, pp. 907–914, or in the article by J. D. Wright and R. J. Copeland earlier cited.

Any solid ceramic membrane material which selectively permeates oxygen in the form of oxygen ions, of either the mixed conductor or solid electrolyte type described above, can be utilized in the present invention. Membranes of the mixed conductor type are described in U.S. Pat. No. 5,240,480, which is incorporated herein by reference. This patent discloses a membrane which comprises a porous layer with an average pore radius of less than 10 microns upon which is deposited a nonporous dense layer, in which both the porous substrate and the nonporous dense layer comprise multicomponent metallic oxides capable of conducting electrons and oxygen ions. This composite membrane operates at temperatures above 500° C. and recovers high purity oxygen by the mechanism discussed earlier. Representative membranes are described in which the porous layer and/or the dense layer are formed from a multicomponent metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$, and $La_{0.2}Ba_{0.8}Co_{0.6}Cu_{0.2}Fe_{0.2}O_{3-x}$, where x is between 0 and 1.

Membranes of the solid electrolyte type can be fabricated by depositing a thin layer of multicomponent oxide on a porous substrate as described in U.S. Pat. No. 5,160,618, which is incorporated herein by reference. A preferred membrane comprises yttria-stabilized zirconia which has been deposited into the micropores of a lanthanum-doped alumina surface layer of a porous alumina substrate having an average pore diameter of less than about 50 nanometers and on the surface layer of the alumina substrate wherein the thickness of the yttria-stabilized zirconia is 0.5 microns or less. The yttria-stabilized zirconia layer is deposited at a temperature of 700°–1100° C. at a pressure of 1 to 760 torr over a time period ranging from 1 to 120 minutes by the following method. At least two metal halides, for example yttrium chloride and zirconium chloride, are vaporized on one side of the substrate described above and an oxidizing gas such as a mixture of oxygen and water is contacted with the other side of the substrate. The two gas mixtures diffuse and react within the pores of the porous surface layer to deposit the corresponding metal oxides therein, forming the membrane capable of separating an oxygen-containing gas mixture by the mechanism described earlier. This thin coating of active membrane material can be deposited on tubes, sheets, or monolithic honeycomb before or after assembly in a membrane module. Additional disclosure covering solid electrolyte membranes and improved electrodes for such membranes is given in U.S. Pat. No. 4,879,016 which is incorporated herein by reference.

When membrane 111 is a mixed conductor membrane, final heating of preheated feed 15 to the membrane operating temperature of 800° to 2,000° F., preferably 1,000° to 1,600° F., is accomplished in final heating zone 107 by electrical resistance heating, direct combustion of preheated feed 15 with a fuel gas, or indirect heat exchange with a hot process fluid including combustion products in a fired process furnace. Oxygen permeate product can be withdrawn from the permeate side of the membrane at subatmospheric pressures by a vacuum blower in order to increase the oxygen partial pressure driving force across the membrane.

When membrane 111 is a solid electrolyte membrane, final heating is accomplished by convective and/or radiative heat transfer in final heating zone 107 utilizing a portion of the heat which is generated electrochemically in the transfer of oxygen across the membrane by the applied voltage. Most of the heat generated in the transfer of oxygen results from resistance heating by the flow of current through the membrane assembly. A portion of this heat is transferred by radiation to an appropriate heat transfer surface, which in turn transfers heat by convection to the feed gas to yield final heated feed 17. The remainder of the generated heat is removed by appropriate heat management methods to control the membrane temperature in the desired range of 800° to 2,000° F., preferably 1,000° to 1,600° F. When operation of membrane zone 109 is started from ambient temperature, a startup heater (not shown) is required until the operating temperature of membrane 111 is high enough to generate sufficient heat for final heating zone 107.

Referring again to FIG. 1, final heated feed 17 passes through the feed side of membrane zone 109 comprising membrane 111, which in one embodiment is a mixed conductor membrane, wherein oxygen diffuses through the membrane driven by an oxygen partial pressure differential in the range of 2 to 80 psi, and hot high purity oxygen permeate stream 13 containing at least 98 vol % oxygen is withdrawn therefrom at 2 to 30 psia. Hot pressurized non-permeate stream 11 is withdrawn at near feed pressure and contains 6 to 18 vol % oxygen. Membrane separation zone 107 typically is sized and operated such that up to about 90% of the oxygen in membrane feed 17 is recovered as product 13. Hot, pressurized non-permeate 11, now containing 6 to 18 vol % oxygen, is cooled in heat exchange zone 103 which preheats compressed feed 9. Cooled, pressurized non-permeate 19 is cooled further in cooler 113, typically against cooling water 20, to yield further cooled, pressurized non-permeate 21 at a pressure of 30–500 psia. Depending on the final application, oxygen permeate product 13 is utilized as withdrawn from the membrane or alternatively is cooled in heat exchange zone 103 and/or cooler 115 to yield final oxygen product 23. When oxygen permeate product 13 is used for combustion enrichment, partial cooling may be needed depending on operating limitations of the combustion system. Further cooling may be required if the oxygen is to be compressed for eventual use at an elevated pressure.

Cooled, pressurized non-permeate 21, now at a temperature below that of membrane zone 109 and a pressure of 30–500 psia, passes to work recovery zone 117 in which the gas is expanded to a lower pressure, typically atmospheric, and is discharged as exhaust 25. Work recovery zone 117 comprises means to recover work from a pressurized gas selected from compressor and pump drivers, pneumatic tools, pneumatic lifts, positioners, impact wrenches, and similar apparatus driven by compressed gas as earlier described. In some cases, exhaust 25 is inherently included in the work utilization method, for example when cooled, pressurized non-permeate 21 is used for pneumatic conveying of solids or the atomization of liquids. Recovered work, described schematically by arrow 27, is utilized in generic process 119 preferably in combination with cooled oxygen product 23. Examples of generic process 119 include:

(1) steel mini-mills which convert scrap steel in electric arc furnaces which use the oxygen product 23 in oxyfuel burners to accelerate melting and in oxyfuel cutting torches including oxyacetylene cutting torches, and use the pressurized non-permeate gas 21 to operate pneumatic positioners, grinders, or chippers, or to supplement or replace instrument air;

(2) glass production in which product oxygen 23 is used for oxygen enrichment of glass melting furnaces and pressurized non-permeate 21 is used for pneumatic conveying of raw materials including silica, soda ash, and/or soda lime within the glass plant;

(3) wood pulping in a pulp mill in which product oxygen 23 is used for oxygen bleaching and delignification, black liquor oxidation, or white liquor oxidation, and pressurized non-permeate 21 is used to replace mill compressed air used for instrument air and pneumatic tools.

(4) compression of product oxygen 23 utilizing work 27 from work recovery zone 117 in which a compressed gas driver operates on pressurized non-permeate 21 (described later);

(5) enriched combustion of liquid fuel in which a portion of pressurized non-permeate 21 is used for fuel atomization and product oxygen 23 is used to enrich the combustion air (described later);

(6) automotive service and repair shops which use oxygen product 23 for oxyacetylene cutting and welding, and use the pressurized non-permeate 21 to operate pneumatic tools and lifts;

(7) metalworking shops which use oxygen product 23 for oxyacetylene cutting and welding, and use the pressurized non-permeate 21 to operate pneumatic shears, punches, drills, and the like; and (8) combustion of furnace charge materials in iron and lead cupolas in which product oxygen 23 is mixed with air in the wind main and the enriched air is introduced through tuyeres into the cupola, or in which product oxygen 23 is injected directly through tuyeres into the cupola to melt iron or lead in the presence of an added energy source such as coke, and cooled, pressurized non-permeate 21 is used for dust removal from baghouse filters and for operation of pneumatic valves and tools.

Recovered work 27 from the expansion of cooled, pressurized non-permeate 21 can be supplemented if necessary by combining a portion 5 of compressed feed 3 with pressurized non-permeate 21 to work recovery zone 117. This would be the preferred supplement if compression zone 101 is operated in an isothermal or intercooled mode. Alternatively, portion 7 can be combined with pressurized non-permeate 19 prior to cooler 113, which would be the preferred supplement if compression zone 101 is operated in an adiabatic mode. Supplementing pressurized non-permeate 21 in either of these modes would be necessary, for example, in option (4) above if the desired oxygen product pressure required more compression work than could be provided by pressurized non-permeate 21 in work recovery zone 117. In this case, incremental capacity would be included in compression zone 101 to provide supplemental compressed gas 5.

In another embodiment, cooled, pressurized, oxygen-depleted non-permeate 21 provides the feed to a pressure swing adsorption (PSA) or a polymeric membrane permeation process and a high-purity nitrogen product (i.e. greater than 97 vol % nitrogen) is recovered therefrom. Feed compression typically is not required because the pressure of the cooled, pressurized, oxygen-depleted non-permeate gas is sufficient to provide the pressure driving force for the PSA or the polymeric membrane process operation. Because the non-permeate is partially depleted in oxygen, a high purity nitrogen product can be recovered therefrom more efficiently and economically compared with recovery from air containing 21 vol % oxygen.

Figure 2:
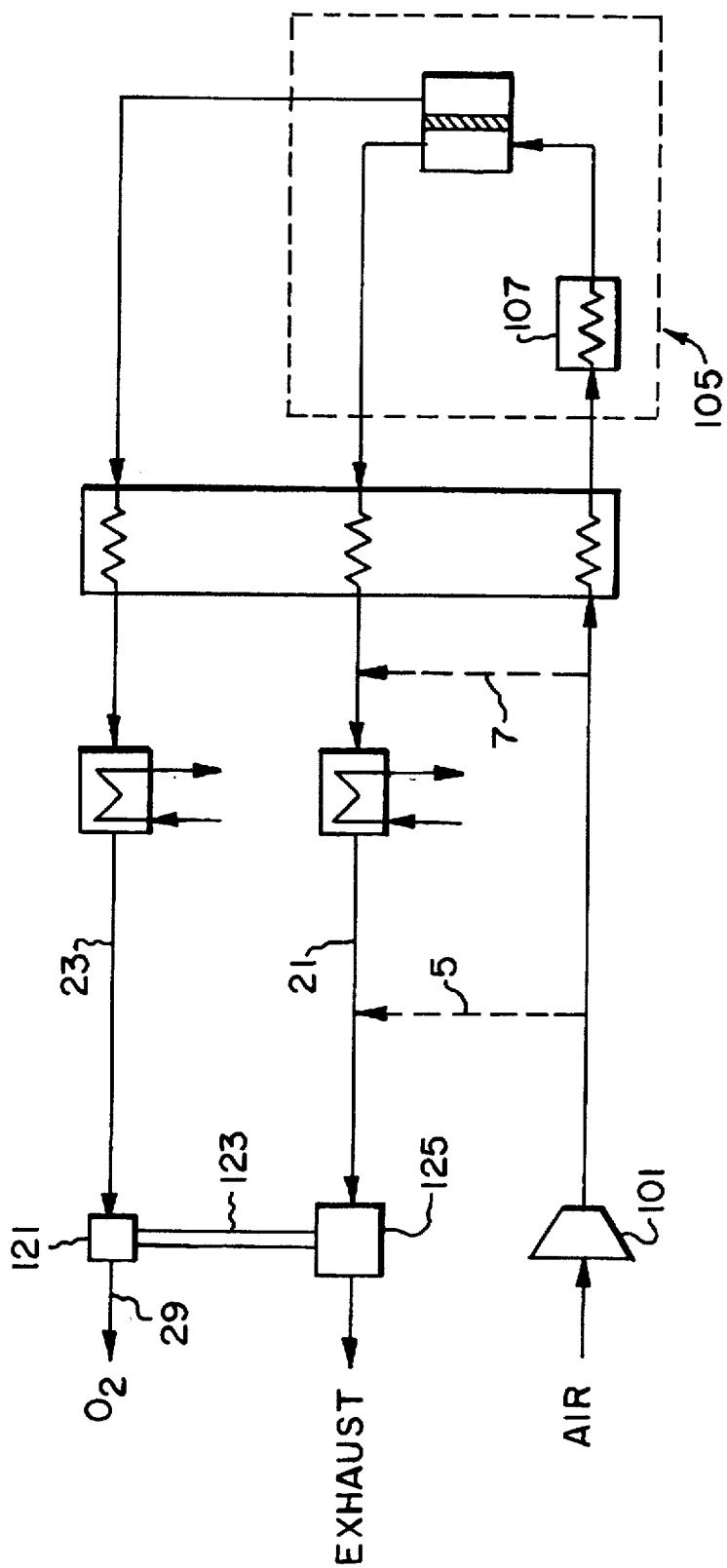
FIG. 2 is a flow diagram of a specific embodiment of the present invention.

A specific embodiment of the invention is shown in FIG. 2 in which oxygen product 23 is compressed to 200–2500 psia in compressor 121 driven by shaft or connecting rod 123 from compressor driver 125 which operates by expansion of pressurized non-permeate gas 21 to atmospheric pressure. Supplemental compressed feed gas 5 or 7 optionally is used as earlier described, typically when the final oxygen product 29 is compressed to higher pressures. Compressor 121 and driver 125 are preferably of the reciprocating type and are joined by integral connecting rod 123. The relative pressures and flow rates of gas streams 21, 23, and 29 determine the relative cylinder sizes required in compressor 121 and driver 125. Gas-driven compressors of this type, commonly called gas boosters, are commercially available from vendors such as Haskel International, Inc. of Burbank, Calif., U.S.A.

Figure 3:
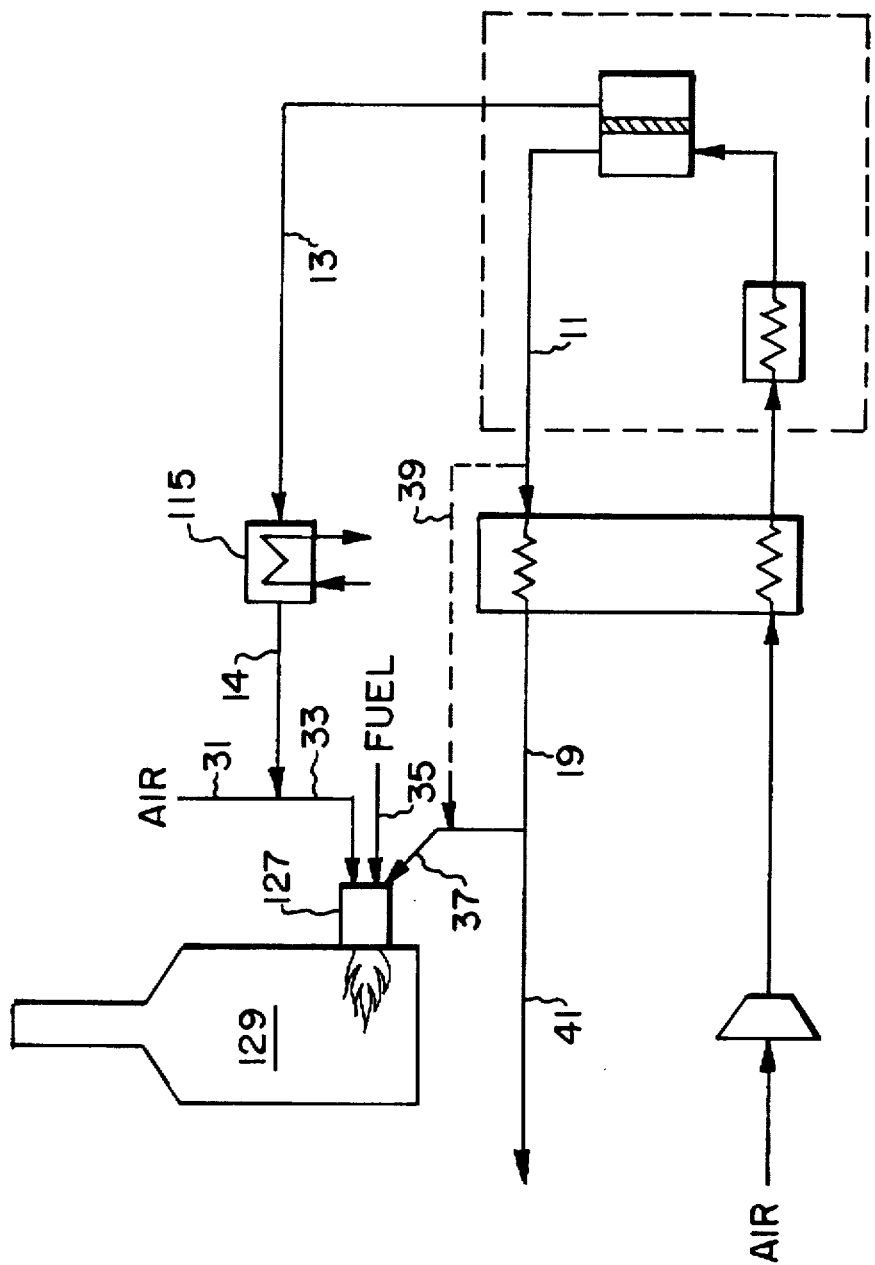
FIG. 3 is a flow diagram of another specific embodiment of the present invention.

Another embodiment of the invention is illustrated in FIG. 3 in which the oxygen product is utilized in oxygen-enriched combustion in furnace 129. The methods and benefits of oxygen enrichment in combustion processes are well-known in the combustion art. Hot oxygen permeate product 13 is cooled in cooler 115 to a temperature compatible with design limits on the combustion air supply system for burner 127, and cooled oxygen 14 is combined with combustion air 31 to provide enriched air 33 to burner 127 operating in furnace 129. Enriched air 33 contains greater than 21 vol % oxygen with a maximum oxygen concentration dictated by upper temperature operating limitations of burner 127 and furnace 129. Alternatively, a portion of hot oxygen 13 or cooled oxygen 14 can be injected or lanced directly into the combustion zone within furnace 129 (not shown) to give combustion improvements well known in the art. Liquid fuel 35, which can be selected from No. 2 or No. 6 fuel oil, bunker C, petroleum refinery residua, coal-water slurry, or other pumpable liquid fuel, is atomized by portion 37 of partially-cooled pressurized non-permeate 19. Atomizing gas 37 may be used at an elevated temperature determined by the type of liquid fuel 35. If atomizing gas 37 is required at higher temperatures, a portion 39 of hot pressurized non-permeate 11 can be provided as necessary. The remaining cooled, pressurized non-permeate gas 41 can be utilized in other applications requiring compressed gas.

EXAMPLE 1

Figure 4:
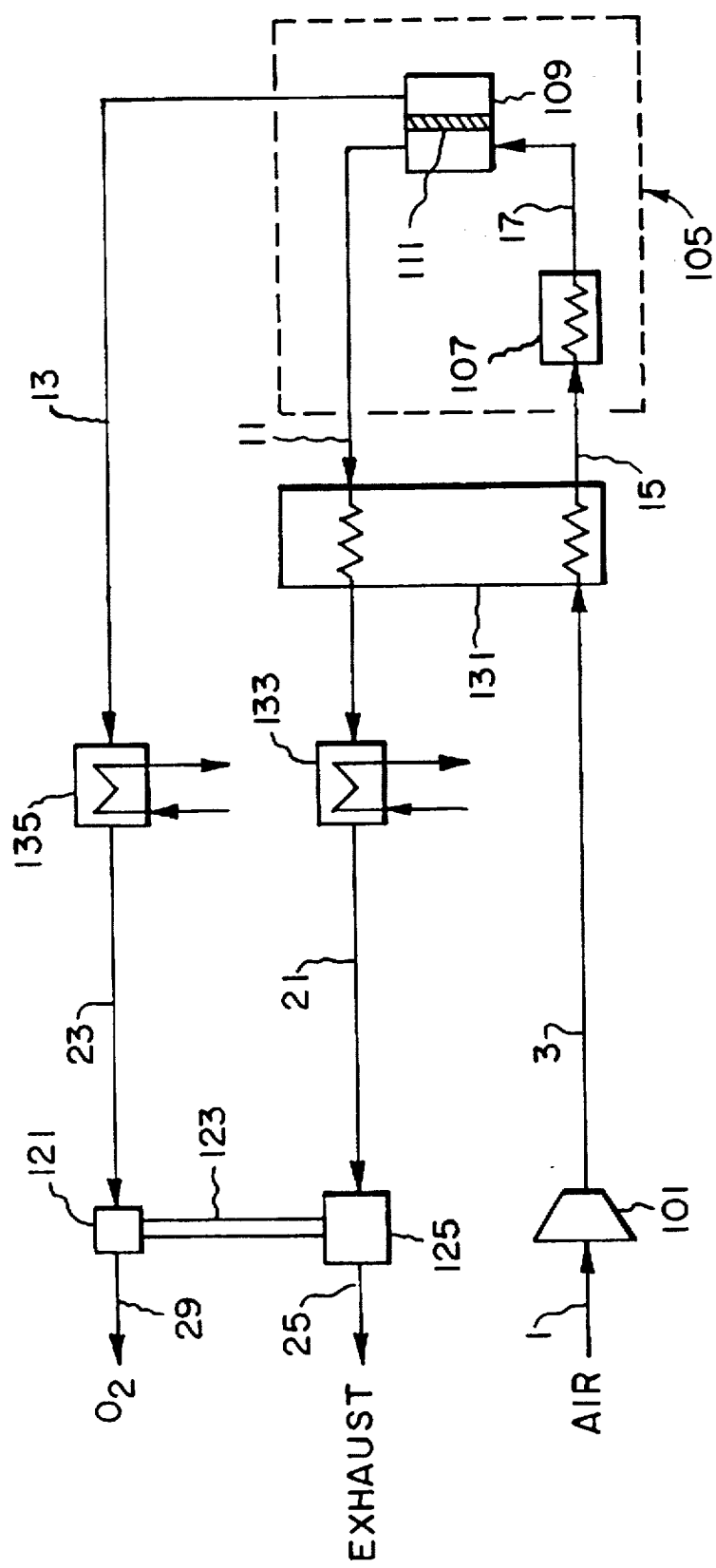
FIG. 4 is a flow diagram of an embodiment of the present invention as illustrated by Example 1.

A heat and material balance was performed for an embodiment of the invention illustrated in FIG. 4 in which air 1 is compressed in two-stage compression zone 101. Compressed feed 3 is heated by indirect heat exchange with hot pressurized non-permeate stream 11 in heat exchange zone 131. Preheated feed 15 passes into separation zone 105 which comprises final heating zone 107 and membrane zone 109 which contains electrically-driven solid electrolyte membrane 111. Preheated feed 15 is heated to 1292° F., which is the operating temperature of membrane 111, in heating zone 107 using a portion of the heat generated electrochemically by the operation of membrane 111 at 500 mV. Final heated feed 17 at 1292° F. and 164.7 psia passes to membrane zone 109 and hot permeate oxygen 13 is withdrawn from the electrically-driven membrane at 164.7 psia. Hot, pressurized non-permeate 11 is cooled against compressed feed 3 in heat exchange zone 131 and further cooled to 90° F. in water-cooled exchanger 133 to yield cooled, pressurized, oxygen-depleted non-permeate 21. Hot oxygen permeate product 13 is cooled to 90° F. in water-cooled exchanger 135. Cooled oxygen product 23 is compressed to 2014.7 psia in compressor 121 driven by driver 125 via connecting rod 123. Compressor 121, connecting rod 123, and driver 125 operate in an integrated reciprocating booster compressor typical of a Model AGT-7/30 gas booster manufactured by Haskel International, Inc. Driver 125 is operated by expansion of cooled, pressurized, oxygen-depleted non-permeate 21. For the purpose of the heat and material balance, pressure drops through heat exchangers and the membrane module were assumed negligible. The process produces 125.4 SCFH of oxygen product at 2014.7 psia from an air feed of 1385 SCFH which corresponds to an oxygen recovery of 43%. The total power consumption by compression zone 101 and electrically-driven solid electrolyte membrane 111 in membrane separation zone 105 is 12.1 Kw. A stream balance for the heat and material balance is given in Table 1.

TABLE 1

| Stream Number | Temperature Deg F | Pressure psia | Flow Rate (SCFH @ 70 F & 14.7 psia) | | | |
|---|---|---|---|---|---|---|
| | | | Nitrogen | Oxygen | Argon | Total |
| 1 | 70 | 14.7 | 1081 | 290.9 | 13.2 | 1385 |
| 3 | 386 | 164.7 | 1081 | 290.9 | 13.2 | 1385 |
| 15 | 968 | 164.7 | 1081 | 290.9 | 13.2 | 1385 |
| 11 | 1292 | 164.7 | 1081 | 165.5 | 13.2 | 1260 |
| 19 | 670 | 164.7 | 1081 | 165.5 | 13.2 | 1260 |
| 21 | 90 | 164.7 | 1081 | 165.5 | 13.2 | 1260 |
| 25 | (a) | 14.7 | 1081 | 165.5 | 13.2 | 1260 |
| 13 | 1292 | 164.7 | 0.0 | 125.4 | 0.0 | 125.4 |
| 23 | 90 | 164.7 | 0.0 | 125.4 | 0.0 | 125.4 |
| 29 | (a) | 2014.7 | 0.0 | 125.4 | 0.0 | 125.4 |

(a) varies depending on actual application

EXAMPLE 2

This Example illustrates the use of cooled oxygen product 23 and cooled, pressurized, oxygen-depleted non-permeate 21 of FIG. 1 in a 1000 ton/day hardwood pulp mill represented by generic process 119. The mill utilizes the well-known kraft process in which wood chips are digested with aqueous alkaline pulping chemicals at elevated temperature which converts the chips to pulp and partially delignifies the pulp. The partially delignified wood pulp is further delignified in a series of bleaching steps including a medium-consistency oxygen delignification (MCOD) reactor system in which the pulp is contacted with oxygen at elevated pressure and temperature. Final bleaching is carried out in selected chemical sequences including an oxygen-enhanced alkaline extraction stage ($E_o$) to provide a high brightness pulp suitable for papermaking. For a 1000 ton/day hardwood kraft mill, typical oxygen requirements for the MCOD and $E_o$ steps are 18 tons/day (1.8 wt % on pulp) and 7 tons/day (0.7 wt % on pulp) respectively.

Referring to FIG. 1, air 1 is compressed to 114.7 psia in compressor 101 to yield compressed air 3 and a portion 5 (approximately 10% of air 3) is withdrawn for use as later described. The remaining portion 9 is preheated in heat exchange zone 103 to 1262° F. against hot pressurized non-permeate 11 and is further heated to 1562° F. in heating zone 107, which in this case is a direct-fired combustor which combusts 79 lb/hr methane with a portion of the oxygen in preheated air 15. Membrane zone 109 operates as earlier described at a temperature of 1562° F. to produce 25 tons/day of hot oxygen permeate 13 from air feed 9 resulting in an oxygen recovery of 46.5%. Membrane 111 is a mixed conductor membrane which operates at a total pressure differential across the membrane of 107.9 psi. Hot pressurized non-permeate 11 is withdrawn at 6.8 psia, cooled against air feed 9 to 576° F. in heat exchange zone 103, further cooled to 70° F. in water-cooled exchanger 113, and combined with compressed air 5 earlier described. The combined stream of cooled, pressurized, oxygen-depleted non-permeate 21 (90% of the total flow) and compressed air 5 (10% of the total flow) at 114.7 psia is sent to the pulp mill compressed air system and is used primarily for mill instrument air and the operation of pneumatic tools. This utilization of cooled non-permeate 21 and compressed air 5 is depicted schematically in FIG. 1 as work recovery zone 117, which in this Example actually comprises a plurality of work recovery zones located within the pulp mill and connected to the mill air system.

Hot oxygen permeate product 13 is cooled to 95° F. in water-cooled exchanger 115 to yield cooled oxygen product 23. In this Example, hot oxygen permeate product 13 is not cooled in heat exchange zone 103; the entire cooling duty is provided by cooler 115. A vacuum blower (not shown) operates on the cooled oxygen product 23 from cooler 115 and provides feed at 6.8 psia to a compression step (not shown) in which the oxygen is compressed to 195 psia for introduction into the medium-consistency oxygen delignification reactor and $E_o$ systems earlier described.

A heat and material balance was carried out for this Example and a stream summary is given in Table 2. For the heat and material balance calculations it was assumed that pressure drop through the heat exchange zones, coolers, and membrane zone was negligible.

This Example illustrates the use of both the oxygen permeate product 23 and the cooled, pressurized, oxygen-depleted non-permeate 21 in a single host process plant. This example sets forth a particularly useful aspect of the present invention in which a major portion of the compressed air normally generated for direct use in the host process, in this case a pulp mill, is utilized for oxygen recovery and the pressurized non-permeate is returned to the mill for recovery of useful work in the mill compressed air system. This arrangement reduces the capital and power requirements for recovering oxygen since incremental compression capacity is added to compressor 101 only for the oxygen recovery requirement. The base design capacity of compressor 101 normally would be selected only to supply the mill compressed air system requirement. Cooled, pressurized, oxygen-depleted non-permeate 21 directly replaces a major fraction of compressed air used in the mill air system. If additional motive gas were required for the mill air system, compressor 101 would be designed for a larger capacity and a correspondingly larger portion 5 of compressed air 3 would be sent directly to the mill air system.

TABLE 2

| Stream Number | Temperature, Deg F | Pressure, psia | Flow Rate (Thousand lbs./hr.) | | | | | |
|---|---|---|---|---|---|---|---|---|
| | | | Nitrogen | Oxygen | Argon | $CO_2$ | Water | Total |
| 1 | 70 | 14.4 | 16.28 | 5.01 | 0.30 | 0 | 0 | 21.59 |
| 3 | 336 | 114.7 | 16.28 | 5.01 | 0.30 | 0 | 0 | 21.59 |
| 5 | 336 | 114.7 | 1.71 | 0.53 | 0.03 | 0 | 0 | 2.28 |
| 9 | 336 | 114.7 | 14.57 | 4.48 | 0.27 | 0 | 0 | 19.31 |
| 15 | 1262 | 114.7 | 14.57 | 4.48 | 0.27 | 0 | 0 | 19.31 |
| 17 | 1562 | 114.7 | 14.57 | 4.17 | 0.27 | 0.22 | 0.18 | 19.39 |
| 11 | 1562 | 114.7 | 14.57 | 2.08 | 0.27 | 0.22 | 0.18 | 17.31 |
| 19 | 576 | 114.7 | 14.57 | 2.08 | 0.27 | 0.22 | 0.18 | 17.31 |
| 21 | 70 | 114.7 | 14.57 | 2.08 | 0.27 | 0.22 | 0.18 | 17.31 |
| 13 | 1562 | 6.8 | 0 | 2.08 | 0 | 0 | 0 | 2.08 |
| 23 | 95 | 6.8 | 0 | 2.08 | 0 | 0 | 0 | 2.08 |

The key and unique feature of the present invention is that the hot, pressurized non-permeate gas is cooled by indirect heat transfer before recovering useful work therefrom. Integrated ion transport membrane systems of the prior art recover work from hot, pressurized non-permeate gas at temperatures at or above the membrane temperature, and therefore require hot gas expansion turbines; in contrast, the present invention allows the use of a different class of work recovery devices which operate at lower temperatures. The invention thereby enables the use of ion transport membrane systems in an alternative range of applications compared with the teachings of the prior art.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A process for the recovery of oxygen from an oxygen-containing gas which comprises:

(a) compressing and heating a stream of oxygen-containing feed gas to yield a hot pressurized feed;

(b) passing said hot pressurized feed into a membrane separation zone comprising one or more oxygen-selective ion transport membranes which divide said zone into a feed side and a permeate side, and withdrawing from said zone a hot, pressurized, oxygen-depleted non-permeate gas from the feed side and a hot oxygen permeate product from the permeate side, wherein said membrane separation zone operates at a first temperature;

(c) cooling at least a portion of said hot, pressurized, oxygen-depleted non-permeate gas to a second temperature; and (d) recovering useful work from at least a portion of the resulting cooled, pressurized oxygen-depleted non-permeate gas by expanding the gas to a lower pressure.

2. The method of claim 1 wherein said oxygen-containing feed gas is air.

3. The method of claim 1 wherein said oxygen permeate product is high purity oxygen which contains at least 98 vol % oxygen.

4. The method of claim 1 wherein said stream of oxygen-containing feed gas is heated at least in part by indirect heat exchange with said hot oxygen-depleted non-permeate gas.

5. The method of claim 4 wherein said ion transport membrane is a mixed conductor membrane and said stream of oxygen-containing feed gas is heated further in an additional heating step to yield said hot pressurized feed.

6. The method of claim 5 wherein said additional heating step is selected from the group consisting of electrical resistance heating, direct combustion of said hot pressurized feed with a fuel, and indirect heat exchange with a hot process fluid.

7. The method of claim 4 wherein said ion transport membrane is a solid electrolyte membrane and said stream of oxygen-containing feed gas is heated further by a portion of the heat generated electrochemically in the operation of said solid electrolyte membrane.

8. The method of claim 1 wherein said stream of oxygen-containing feed gas is heated at least in part by indirect heat exchange with said hot oxygen permeate product.

9. The method of claim 1 wherein said useful work recovered in step (d) is utilized in combination with the utilization of said oxygen permeate product as an oxidant.

10. The method of claim 9 wherein said useful work is applied by utilizing at least a portion of said resulting cooled, pressurized, oxygen-depleted non-permeate gas to replace instrument air in a kraft pulp mill and said oxygen permeate product is used for oxygen delignification and bleaching of partially delignified pulp in said mill.

11. The method of claim 9 wherein said useful work is applied by utilizing a portion of said resulting cooled, pressurized, oxygen-depleted non-permeate gas to atomize a liquid fuel in a combustion process which utilizes said oxygen permeate product as a portion of the oxidant for combusting said fuel.

12. The method of claim 11 wherein said cooled, pressurized, oxygen-depleted non-permeate gas is used at a temperature up to 600° F. for atomizing said liquid fuel.

13. The method of claim 9 wherein said useful work is applied by utilizing a portion of said resulting cooled, pressurized, oxygen-depleted non-permeate gas to operate one or more pneumatic tools and said oxygen permeate product is utilized for oxyfuel cutting of metal.

14. The method of claim 1 wherein said hot oxygen permeate product is cooled and then is compressed by a compressor driven by the expansion of at least a portion of the resulting cooled, pressurized, oxygen-depleted non-permeate gas.

15. The method of claim 1 which further comprises utilizing the resulting cooled, pressurized, oxygen-depleted non-permeate gas of step (c) as the feed to a pressure swing adsorption process or a polymeric membrane permeation process and recovering a high-purity nitrogen product therefrom.

16. A process for the recovery of oxygen from an oxygen-containing gas which comprises:

(a) compressing a stream of oxygen-containing feed gas to yield a compressed feed gas and heating a portion of said compressed feed gas to yield a hot pressurized feed;

(b) passing said hot pressurized feed into a membrane separation zone comprising one or more oxygen-selective ion transport membranes which divide said zone into a feed side and a permeate side, and withdrawing from said zone a hot, pressurized, oxygen-depleted non-permeate gas from the feed side and a hot oxygen permeate product from the permeate side, wherein said membrane separation zone operates at a first temperature;

(c) cooling at least a portion of said hot, pressurized, oxygen-depleted non-permeate gas to a second temperature;

(d) combining the resulting cooled, pressurized oxygen-depleted non-permeate gas with the remaining portion of said compressed feed gas; and (e) recovering useful work from the resulting combined pressurized oxygen-depleted non-permeate gas by expanding the gas to a lower pressure.

17. The method of claim 16 wherein said oxygen-containing feed gas is air.

18. The method of claim 16 wherein said oxygen permeate product is high purity oxygen which contains at least 98 vol % oxygen.

* * * * *